June 28, 1966 W. S. APPLEMAN 3,258,140

TAIL GATE LOADING APPARATUS

Filed June 29, 1964 8 Sheets-Sheet 1

INVENTOR.
WILLIAM S. APPLEMAN
BY Schmieding and Fultz
ATTORNEYS

June 28, 1966 W. S. APPLEMAN 3,258,140

TAIL GATE LOADING APPARATUS

Filed June 29, 1964 8 Sheets-Sheet 2

INVENTOR.
WILLIAM S. APPLEMAN

BY Schmieding and Fultz

ATTORNEYS

June 28, 1966 W. S. APPLEMAN 3,258,140

TAIL GATE LOADING APPARATUS

Filed June 29, 1964 8 Sheets-Sheet 3

INVENTOR.
WILLIAM S. APPLEMAN

BY Schmieding and Fultz
ATTORNEYS

June 28, 1966 W. S. APPLEMAN 3,258,140

TAIL GATE LOADING APPARATUS

Filed June 29, 1964 8 Sheets-Sheet 4

INVENTOR.
WILLIAM S. APPLEMAN
BY Schmieding and Fultz
ATTORNEYS

INVENTOR.
WILLIAM S. APPLEMAN
BY
Schmieding and Fultz
ATTORNEYS

June 28, 1966 W. S. APPLEMAN 3,258,140

TAIL GATE LOADING APPARATUS

Filed June 29, 1964 8 Sheets-Sheet 6

INVENTOR.
WILLIAM S. APPLEMAN
BY Schmieding and Fultz
ATTORNEYS

June 28, 1966 W. S. APPLEMAN 3,258,140

TAIL GATE LOADING APPARATUS

Filed June 29, 1964 8 Sheets-Sheet 7

INVENTOR.
WILLIAM S. APPLEMAN

BY Schmieding and Fultz
ATTORNEYS

June 28, 1966 W. S. APPLEMAN 3,258,140

TAIL GATE LOADING APPARATUS

Filed June 29, 1964 8 Sheets-Sheet 8

INVENTOR.
WILLIAM S. APPLEMAN

BY Schmieding and Fultz

ATTORNEYS

United States Patent Office 3,258,140
Patented June 28, 1966

3,258,140
TAIL GATE LOADING APPARATUS

William S. Appleman, Galion, Ohio, assignor to The Cobey Corporation, Galion, Ohio, a corporation of Ohio Filed June 29, 1964, Ser. No. 378,837
17 Claims. (Cl. 214—77)

This invention relates to loading apparatus and particularly to an improved power operated loader adapted to be mounted on a truck or other platform to be loaded.

In general, the loading apparatus of the present invention comprises a frame means on which are mounted a pair of lift arms which in turn carry a load supporting platform. A power means, preferably in the form of a hydraulic cylinder, is utilized to move the load supporting platform from between a ground level load supporting position and a truck bed or platform level position at which latter position the load being lifted is readily transferred to the truck bed or platform.

In accordance with the present invention, the loading apparatus comprises a novel linkage that permits folding of the above mentioned load supporting platform to a position beneath the truck bed or other platform to pe loaded.

As another aspect of the present invention the loading apparatus comprises adjusting means for adapting the load supporting platform to either ramp at ground level or level-rise from ground to truck bed positions.

As another aspect of the present invention the loading apparatus comprises a novel power means and associated platform position control mechanism for raising and automatically positioning the load supporting platform at truck bed or platform level.

It is, therefore, an object of the present invention to provide a loading apparatus of the type described that incorporates a novel load supporting platform and linkage mechanism adapted to fold the platform and store it below the platform to be loaded.

It is another object of the present invention to provide a loading apparatus of the type described that comprises a novel linkage and adjustable lever for establishing the level of the load supporting platform for ramping operation and to compensate for normal wear of the linkage components and vertical deflection of the springs of the vehicle on which the loading apparatus is mounted.

It is still another object of the present invention to provide a loading apparatus of the type described that includes a novel power means and associated platform position control mechanism.

Further objects and advantages of the present invention will be apparent from the following description, reference being had to the accompanying drawings wherein a preferred form of embodiment of the invention is clearly shown.

Figure 2:
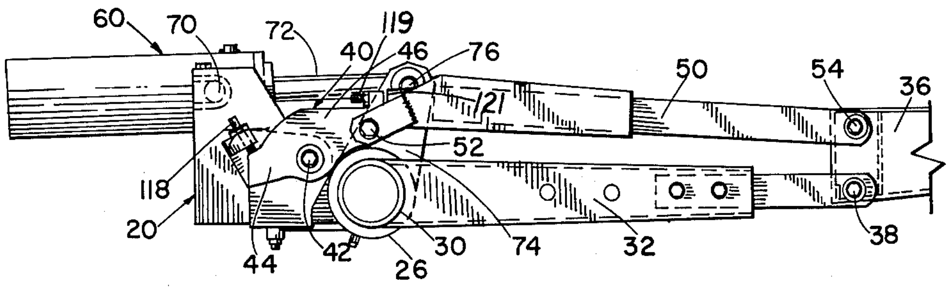
FIG. 2 is a side elevational view of the loading apparatus of FIG. 1.
Figure 2A:
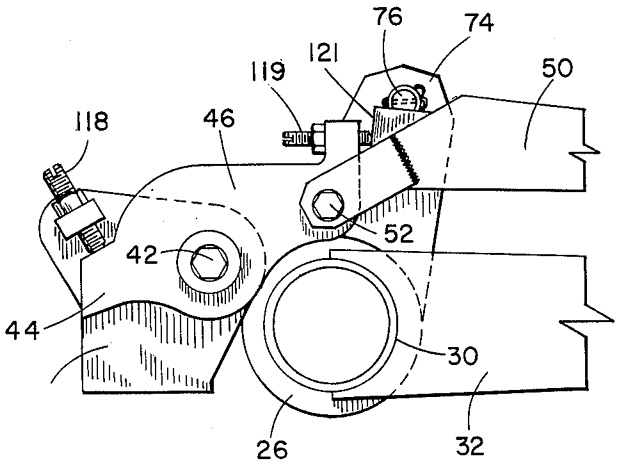
Figure 3:
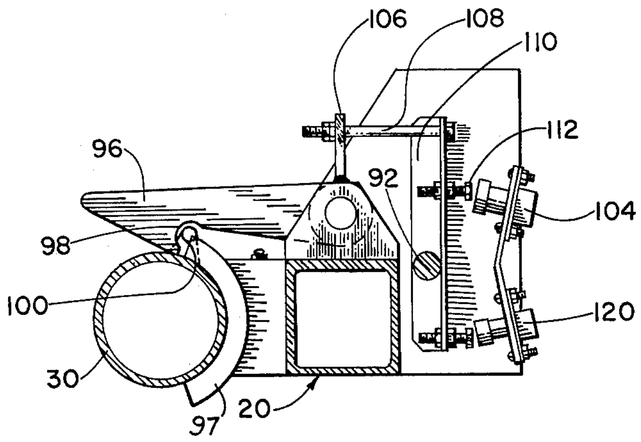
Figure 4:
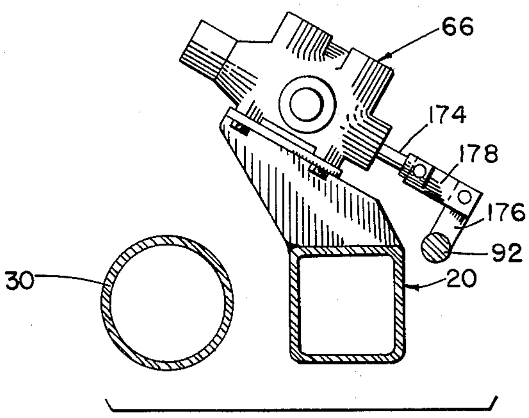
Figure 5:
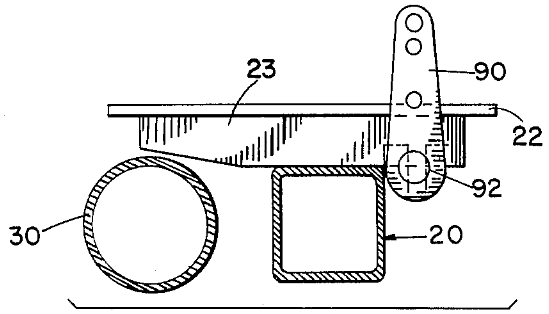
Figure 6:
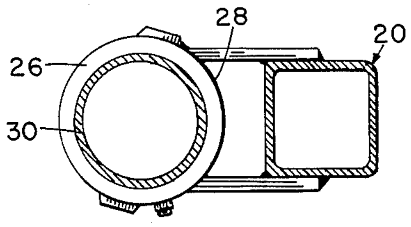
Figure 7:
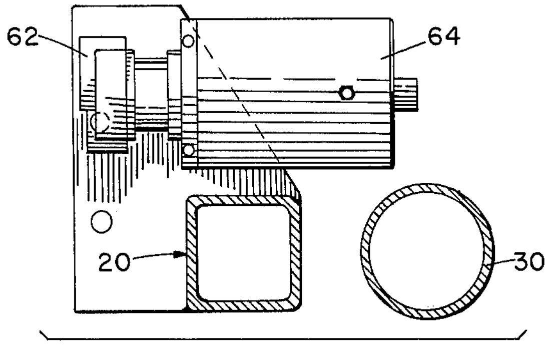
Figure 8:
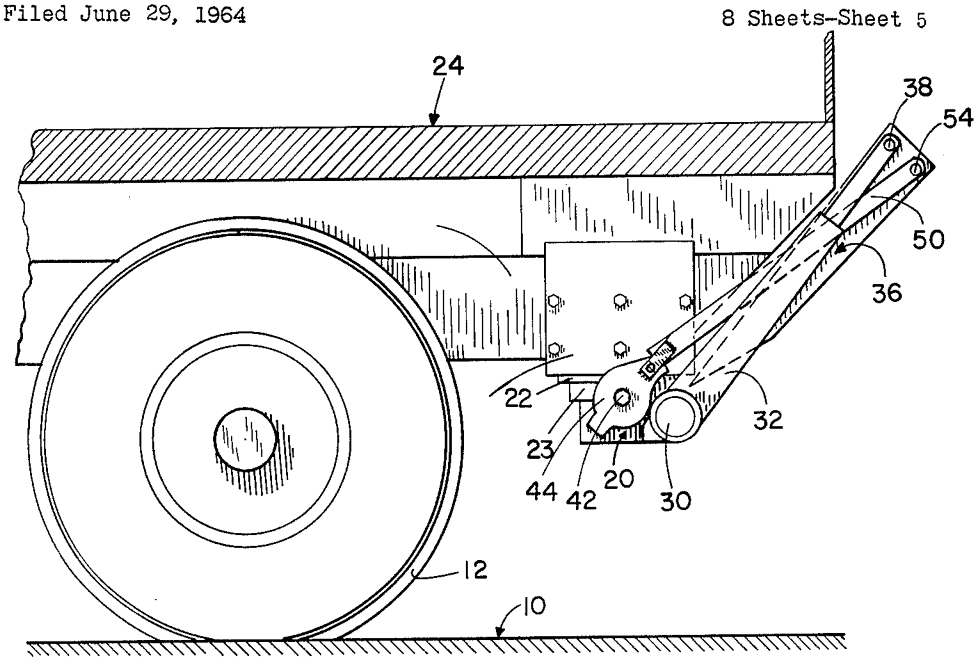
Figure 8A:
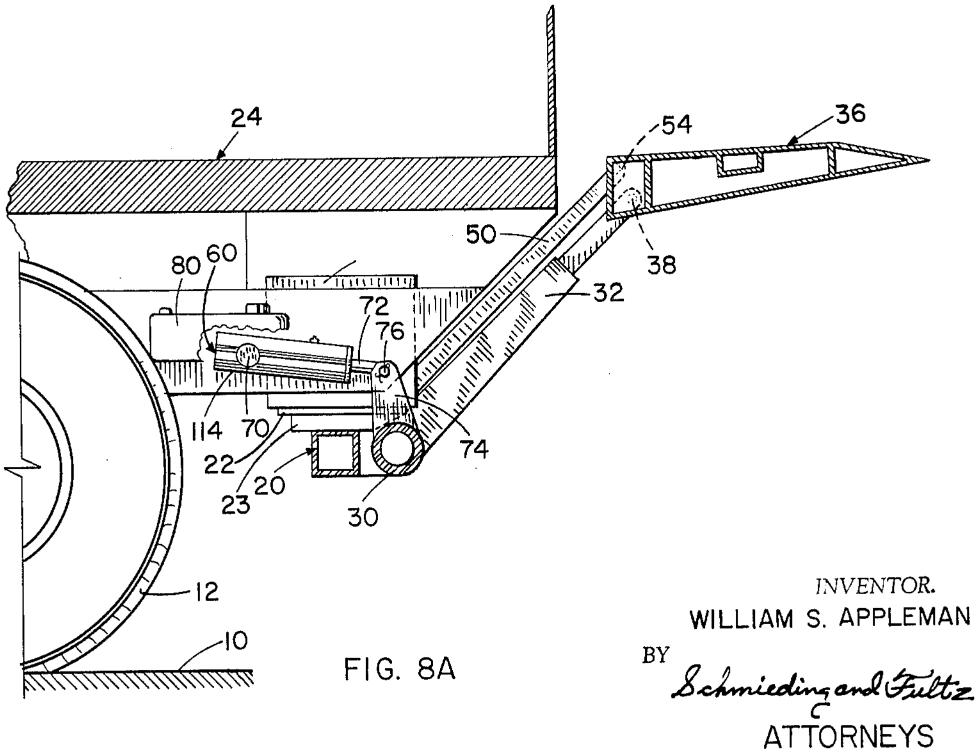
Figure 8B:
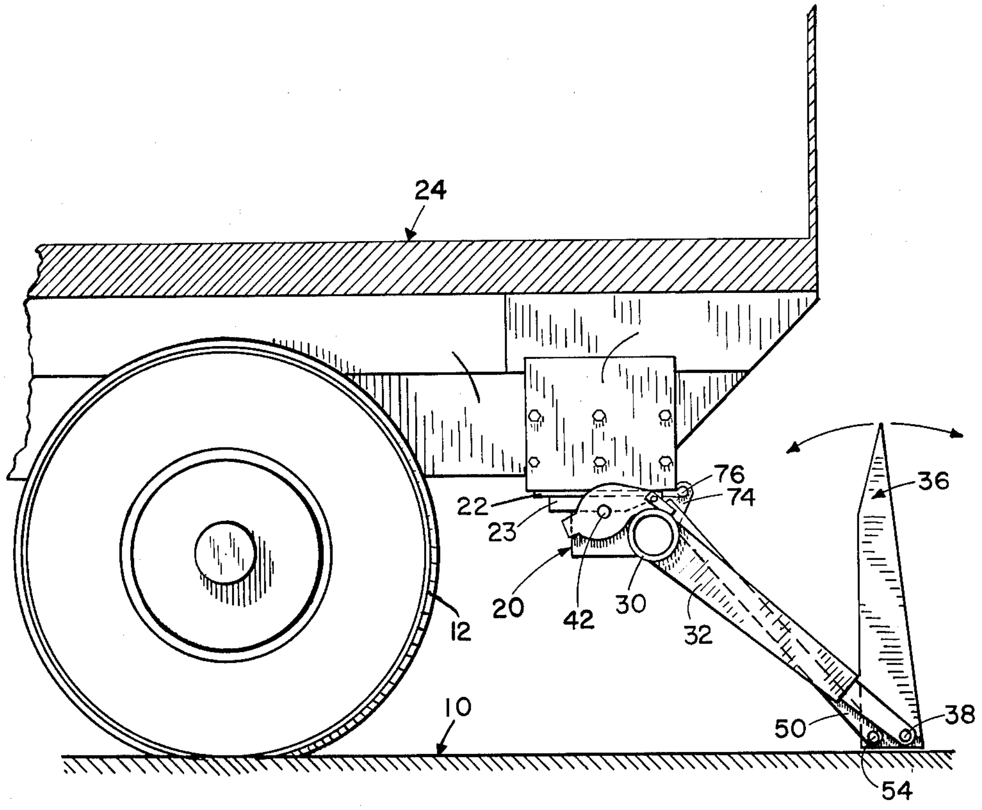
Figure 9:
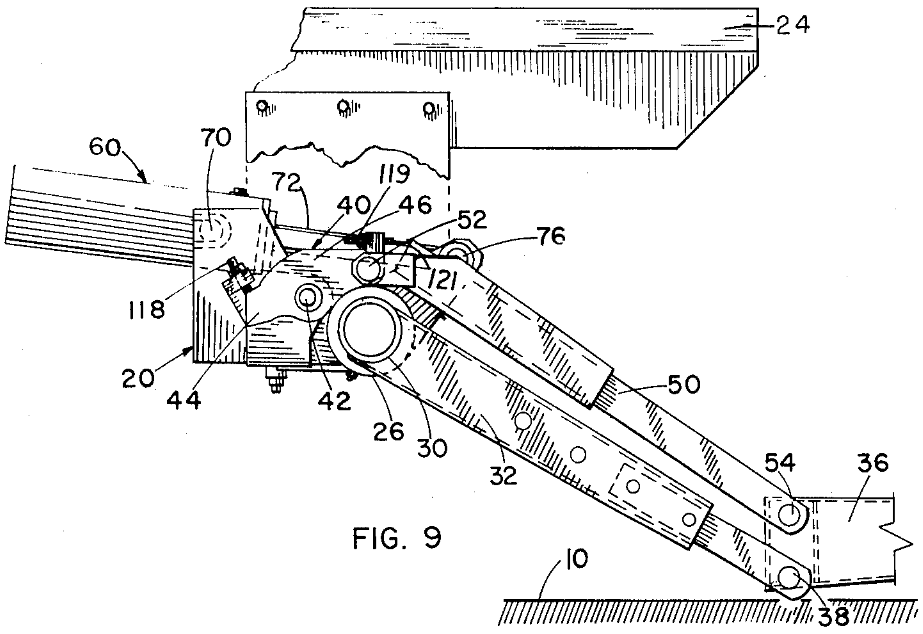
Figure 10:
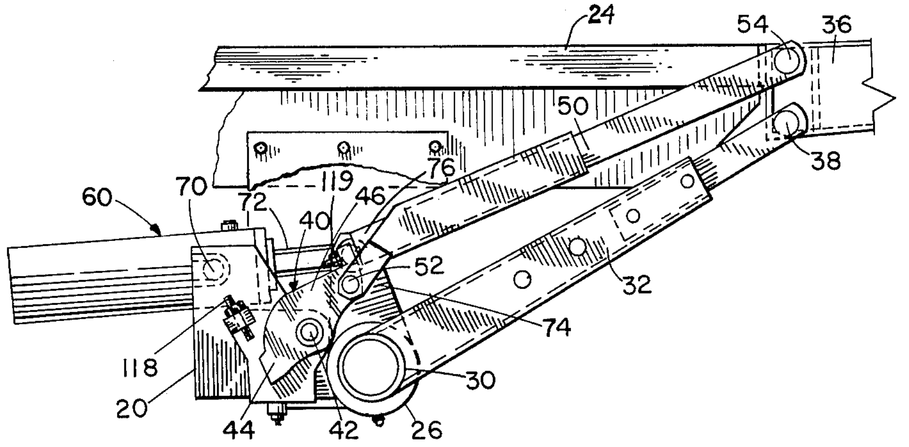
Figure 11:
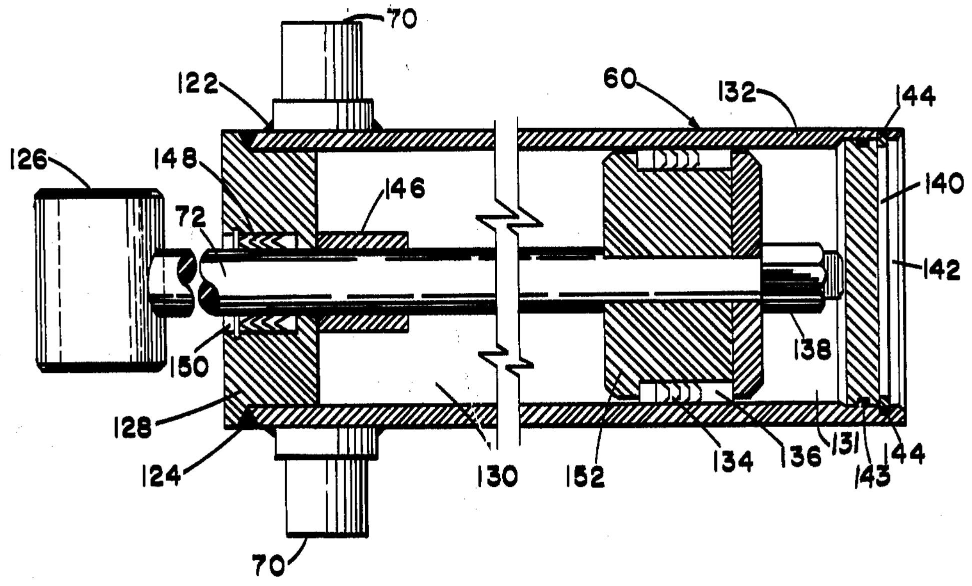
Figure 12:
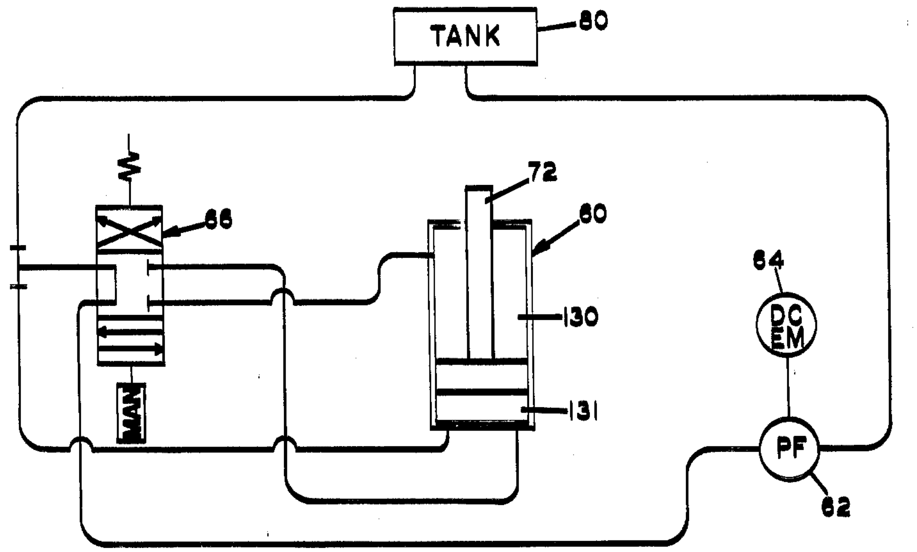

FIG. 2–A is a partial side elevational view showing a portion of the linkage of the loading apparatus of the preceding figures;

FIG. 3 is a side elevational view of a latch and switches, the latter comprising a portion of a platform position control mechanism of the present invention;

FIG. 4 is a side elevational view of a valve means comprising a component of said platform position control mechanism;

FIG. 5 is a side sectional view of a manual lever for actuating said platform position control mechanism;

FIG. 6 is a side sectional view showing a shaft bearing incorporated in the loading apparatus;

FIG. 7 is a side sectional view of an electric motor and pump comprising components of said position control mechanism;

FIG. 8 is a side elevational view showing the configuration of the linkage of the loading apparatus with the load supporting platform in a storage position;

FIG. 8–A is a side elevational view showing the configuration of the linkage of the loading apparatus with the load supporting platform in a raised position;

FIG. 8–B is a side elevational view showing the configuration of the linkage of the loading apparatus with the load supporting platform in an unfolding configuration;

FIG. 9 is a second side elevational view showing the configuration of the linkage of the loading apparatus with the load supporting platform approximately at ground level position;

FIG. 10 is a third side elevational view showing the configuration of the linkage of the loading apparatus with the load supporting platform at the level of the platform to be loaded;

FIG. 11 is a top sectional view of a power cylinder for actuating the apparatus of the present invention; and FIG. 12 is a diagrammatic view of the electro-hydraulic control system comprising a portion of the present invention.

Figure 1:
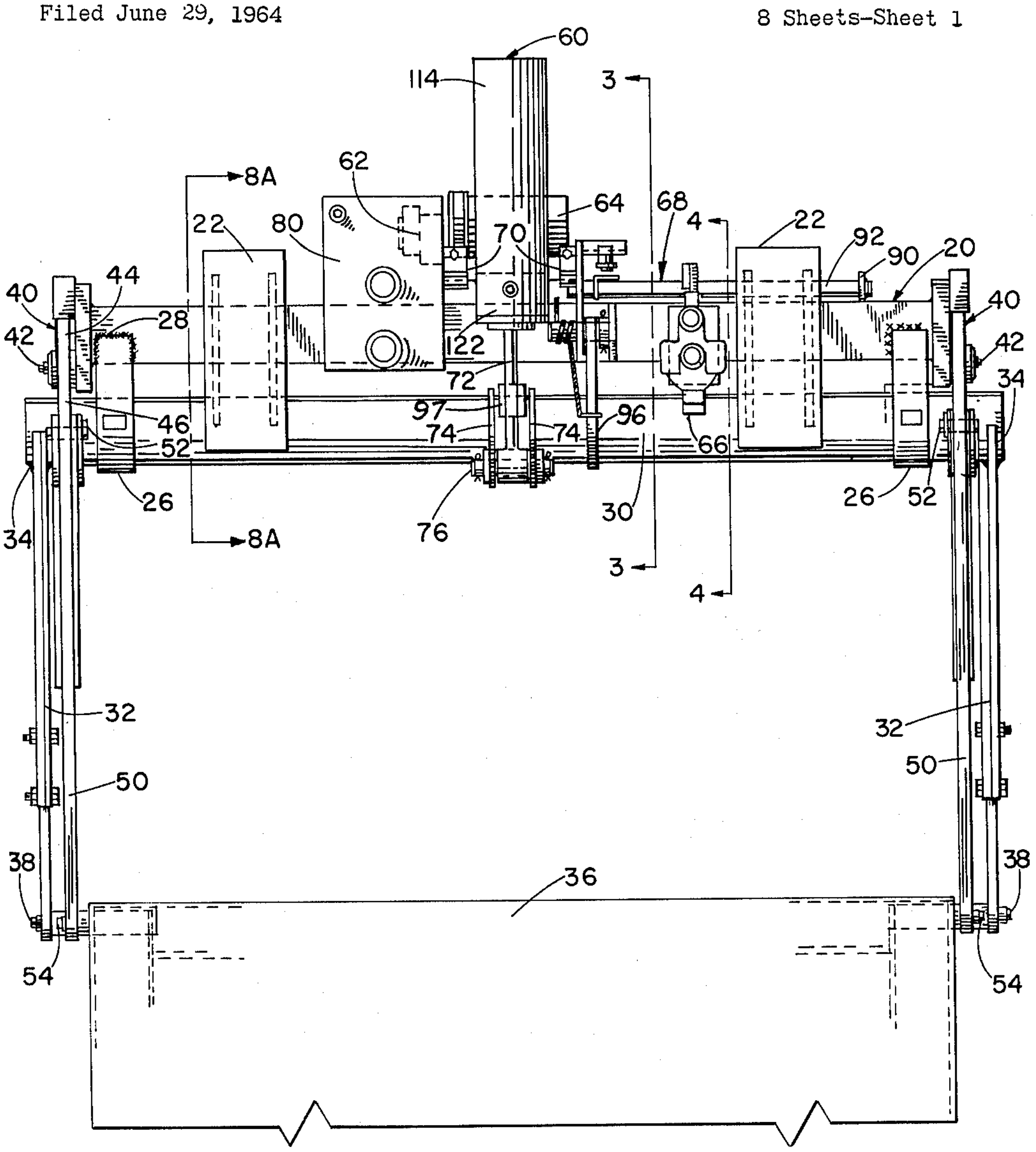
FIG. 1 is a top elevational view of a loading apparatus constructed in accordance with the present invention.

Referring in detail to the drawings, FIGS. 1 and 2 illustrate a loading apparatus constructed in accordance with the present invention which comprises a frame means indicated generally at 20 that includes two mounting brackets 22, FIGS. 1 and 8–A, adapted for attachment to a vehicle frame or other platform to be loaded.

A pair of bearings 26, one of which is shown in detail in FIG. 6, are welded to frame means 20 at the welded junctions 28 and serve to rotatably support a shaft means 30 on the ends of which are mounted a pair of lift arms 32.

The inner ends of lift arms 32 are welded to shaft means 30 at welded junctions 34 and the outer ends of the arms are pivotally attached to a load supporting platform 36 at first pivotal connections 38.

With continued reference to FIGS. 1 and 2, a pair of levers indicated generally at 40 are pivoted to frame 20 at pivot pins 42 and each of the levers includes a front arm 44 and a rear lever arm 46.

The rear lever arms 46 are pivotally attached to a pair of links 50 at the pivot pins 52, the rear ends of said links being attached to load supporting platform 36 at pivot pins 54.

The lift mechanism is actuated by a power cylinder indicated generally at 60, FIGS. 1, 2 and 8–A, which receives pressurized fluid from pump 62 driven by an electric motor 64, the side elevational view of said pump and motor being illustrated in FIG. 7.

Power cylinder 60 is mounted to the frame means at the pivot pins 70 journaled on the frame means and a piston rod 72 is attached to shaft arm members 74 at a pivot pin 76.

Referring next to FIG. 11 the structural components for power cylinder 60 comprise a cylinder housing 132 provided with an outer end closure 128 welded to the outer end of the cylinder housing at a weld 124.

A piston 152 mounted on the inner end of a piston rod 72 by a nut 138 includes an oil seal carried in grooves 136. A round cap member 140 is removably inserted in an annular recess 142 in the cylinder wall and this cap member is retained in place by a snap ring 144, a resilient seal 143 being provided between the periphery of the cap member and the inner wall of the cylinder. It will be noted from FIG. 11 that the only welding of cylinder housing 132 is done at the outer or ram end at the cap weld 124 and mounted pivot welds 122 whereby any distortion of cylinder housing 132, due to the heat of welding is remote from the operating end of the cylinder wherein the piston travels.

Hydraulic fluid for the circuit is supplied by a reservoir 80 mounted on frame means 20.

The flow of fluid to and from the power cylinder is controlled by valve means 66, FIG. 4, mounted on the frame means. This valve means comprises a portion of an electro-hydraulic control apparatus indicated generally at 68 in FIG. 1. Components of the control mechanism are shown in detail in FIGS. 3, 4, 5 and 7 and the hydraulic circuit is diagrammatically illustrated in FIG. 12.

In operation, load supporting platform 36 is normally disposed in the folded configuration of FIG. 8 with said platform underlying the truck bed or other platform to be loaded.

The folded platform, FIG. 8, is unfolded by first hydraulically lowering it, while still folded, by the initial movement of manual lever 90 forwardly or to the right. FIG. 5, frees shaft 30 for rotation whereby load supporting platform 36 can be lowered. This rotates a control shaft 92 and thereby lifts a safety latch member 96, FIG. 3, upwardly via lever 110, rod 108, and arm 106 whereby a latch portion 98 thereon disengages a latch portion 100 on shaft means 30. When it gets to position of FIG. 8–B the platform is manually swung through a 90 degree arc to the position of FIG. 9.

After load supporting platform 36 is loaded at ground level in the position of FIG. 9, manual lever 90 is actuated forwardly, or to the left as viewed in FIG. 5, to close a reverse motor switch 120 by means of arm 110, FIG. 3, on control shaft 92, and a switch engaging element 112. As seen in FIG. 12, this pressurizes the front chamber 130 of power cylinder 60 whereby ram 72 is retracted causing rotation of shaft means 30 in a counterclockwise direction as viewed in FIG. 9. This swings main lift arm 32 upwardly to the platform level position of FIG. 10 wherein the top surface of the load supporting platform is level with the platform to be loaded.

Valve 66 shown diagrammatically in FIG. 12 is of the conventional 3-position closed center type and functions to either pressurize chamber 131 and drain chamber 130 of the power cylinder 60 or drain chamber 131 and pressurize chamber 130. When the valve is centered, as illustrated, both chambers 130 and 131 are isolated from pressure and tank.

Actuation of manual lever 90 also shifts a plunger rod 174 of valve means 66, FIG. 4, via control shafts 92, a valve actuating arm 176 and link 178. Manual actuation of lever 90 to the right as viewed in FIGS. 3 and 4, shifts the spool within valve means 66 so as to pressurize chamber 131 and drain chamber 130.

Actuation of the lever 90 to the left, FIG. 5, shifts the spool within valve means 66 to pressurize front chamber 130 and drain chamber 131.

It should be pointed out that as platform 36 is raised from the ground position of FIG. 9 to the truck bed position of FIG. 10 the pivot point of the linkage shifts from pivot 52 for lever arm 46 and link 50 to pivot 42 of lever 40.

When it is desired to fold away lift platform 36 the linkage and platform are first disposed in the ground level position of FIG. 9. The rear edge of platform 36 is next manually rotated through a 90 degree arc in a counterclockwise direction as viewed in FIG. 8–B. Lever 90 is next actuated to the left, FIG. 5, and as arms 32 are raised, the previously described linkage hydraulically folds the platform through an additional 90 degree arc. The power cylinder is further pressurized to raise the arms and folded platform to the travel position under the platform or vehicle bed.

To accomplish lowering, after unfolding, actuation of manual lever 90 to the right as viewed in FIG. 5, closes motor starter switch 104 by means of arm 110, FIG. 3, on control shaft 92, and a switch engaging element 112.

With continued reference to FIG. 3, and also to the diagrammatic circuit of FIG. 12, when starter switch 104 energizes motor 64, pump 62 delivers pressurized fluid through valve 66 from reservoir 80 to chamber 131 of power cylinder 60 whereby ram 72 of the cylinder is extended thereby rotating shaft means 30 to cause lift arms 32 to lower lift platform 36 from the unfolded position of FIG. 2 to the ground level position of FIG. 9.

As the platform is lowered the pivoting of the linkage shifts from pivot 42 of lever 40 to pivot 52 between lever arm 46 and link 50.

With reference to FIG. 2–A and FIG. 9, the platform 36 can be adjusted to ramp or be inclined upwardly when at the ground level position of FIG. 9 by adjusting the stop screws 118. When screws 118 are turned away from lever arm 44 they extend link 50 and pivot the lower front edge of the platform about pivots 38 on the ends of arm 32.

If it is desired to return platform 36 to a nonramped level-rise position wherein the top surface of the platform is level through its path of travel, the stop screws 118 are advanced against lever arms 44 thereby retracting links 50 relative to stationary arm pivots 38.

Referring next to FIGS. 2–A and 10 the level of platform 36 is adjusted to compensate for truck spring deflection and wear by adjusting stop screws 119. When screws 119 are advanced towards shoulders 121, FIGS. 2–A and 9, then links 50 are retracted and pivot the lower front edge of platform 36 about stationary arm pivots and thereby raise the rear edge of platform 36. Conversely, when stop screws 119 are retracted relative to shoulders 121 the rear edge of platform 36 is lowered.

While the form of embodiment of the present invention as herein disclosed constitutes a preferred form, it is to be understood that other forms might be adopted, all coming within the scope of the claims which follow.

I claim:

1. A loading apparatus comprising, in combination, frame means adapted for attachment to a receiving platform; bearing means mounted on said frame means; shaft means journaled for rotation in said bearing means; lever means pivotally mounted on said frame means and including a lever arm; a right lift arm including an inner end attached to said shaft means and an outer end; a left lift arm including an inner end attached to said shaft means and an outer end; a lift platform including first pivotal connections with said outer ends of said lift arms and a second pivotal connection spaced from said first pivotal connections; a link laterally spaced from said lift arms and including an inner end pivoted to said lever arm at a lever pivot and an outer end secured to said second pivotal connection of said lift platform; a lever stop on said frame means for limiting the pivoting of said lever means; and power means for rotating said shaft means to swing said lift arms and raise said lift platform from a lower horizontally extending ground level position to an upper horizontally extending level position, said lift platform being disposable in a storage position beneath said receiving platform by rotation of said lift platform about said first pivotal connections.

2. The loading apparatus defined in claim 1 wherein said lever stop is adjustable for varying the angle of said lift platform.

3. The loading apparatus defined in claim 1 that includes an adjustable stop for said lever pivot.

4. A loading apparatus comprising, in combination, frame means adapted for attachment to a receiving platform; bearing means mounted on said frame means; shaft means journaled for rotation in said bearing means; lever means pivotally mounted on said frame means and including a lever arm; a right lift arm including an inner end attached to said shaft means and an outer end; a left lift arm including an inner end attached to said shaft means and an outer end; a lift platform including first pivotal connections with said outer ends of said lift arms and a second pivotal connection spaced above said first pivotal connections; a link laterally spaced from and above said lift arms and including an inner end pivoted to said lever arm at a lever pivot and an outer end secured to said second pivotal connection of said lift platform; a lever stop on said frame means for limiting the pivoting of said lever means; and power means for rotating said shaft means to swing said lift arms and raise said lift platform from a lower horizontally extending ground level position to an upper horizontally extending level position, said lift platform being disposable in a storage position beneath said receiving platform by rotation of said lift platform about said first pivotal connections.

5. The loading apparatus defined in claim 4 wherein said lever stop is adjustable for varying the angle of said lift platform.

6. The loading apparatus defined in claim 4 that includes an adjustable stop for said lever pivot.

7. A loading apparatus comprising, in combination, frame means adapted for attachment to a receiving platform; bearing means mounted on said frame means; shaft means journaled for rotation in said bearing means; a lever including a central pivotal connection with said frame means above and forwardly of said shaft means, a first forwardly extending lever arm, and a second rearwardly extending lever arm; a right lift arm including an inner end attached to said shaft means and an outer end; a left lift arm including an inner end attached to said shaft means and an outer end; a platform including first pivotal connections with said outer ends of said lift arms and a second pivotal connection spaced above said first pivotal connections; a link laterally spaced from and above said lift arms and including a front end pivotally attached to said second lever arm at a lever pivot and a rear end secured to said second pivotal connection of said lift platform; a lever stop on said frame means for limiting the pivoting of said lever; and power means for rotating said shaft means to swing said lift arms and raise said lift platform from a lower horizontally extending ground level position to an upper horizontally extending platform level position, said lift platform being disposable in a storage position beneath said receiving platform by rotation of said lift platform about said first pivotal connections.

8. The loading apparatus defined in claim 7 wherein said lever stop is adjustable for varying the angle of said lift platform.

9. The loading apparatus defined in claim 7 that includes an adjustable stop for said lever pivot.

10. A loading apparatus comprising, in combination, frame means adapted for attachment to a receiving platform; bearing means mounted on said frame means; shaft means journaled for rotation in said bearing means; a lever including a central pivotal connection with said frame means above and forwardly of said shaft means, a first forwardly extending lever arm, and a second rearwardly extending lever arm; a right lift arm including an inner end attached to said shaft means and an outer end; a left lift arm including an inner end attached to said shaft means and an outer end; a lift platform including first pivotal connections with said outer ends of said lift arms and a second pivotal connection spaced above said first pivotal connections; a link laterally spaced from and above said lift arms and including a front end pivotally attached to said second lever arm at a lever pivot and a rear end secured to said second pivotal connection of said lift platform; a lever stop on said frame means for limiting the pivoting of said lever; and power means for rotating said shaft means to swing said lift arms and raise said lift platform from a lower horizontally extending ground level position to an upper horizontally extending platform level position, said lift platform being disposable in a storage position beneath said receiving platform by rotation of said lift platform about said first pivotal connections.

11. The loading apparatus defined in claim 10 wherein said lever stop is adjustable for varying the angle of said lift platform.

12. The loading apparatus defined in claim 10 that includes an adjustable stop for said lever pivot.

13. A loading apparatus comprising, in combination, frame means adapted for attachment to a receiving platform; shaft means journaled for rotation on said frame means; a lift arm including an inner end attached to said shaft means and an outer end; a lift platform pivotally mounted on said outer end of said lift arm; parallel linkage means for maintaining said lift platform in horizontal disposition during rotation of said shaft means; a control shaft journaled on said frame means; a first latch element on said shaft means; a second latch element on said control shaft; a lever on said control shaft for rotating said control shaft to disengage said latch elements; power means for rotating said shaft means to swing said lift arms and platform; a first switch for energizing said power means to rotate said shaft means in one direction; and a second switch for energizing said power means to rotate said shaft means in the other direction.

14. The apparatus defined in claim 13 wherein said switches are actuated by movement of said lever.

15. A loading apparatus comprising, in combination, frame means adapted for attachment to a receiving platform; shaft means journaled for rotation on said frame means; a lift arm including an inner end attached to said shaft means and an outer end; a lift platform pivotally mounted on said outer end of said lift arm; parallel linkage means for maintaining said lift platform in horizontal disposition during rotation of said shaft means; a control shaft journaled on said frame means; a first latch element on said shaft means; a second latch element on said control shaft; a lever on said control shaft for rotating said control shaft to disengage said latch elements; an arm including an inner end attached to said shaft means and an outer end; a hydraulic cylinder pivotally attached to said frame means and including a piston rod pivotally connected to said outer end of said arm; valve means for controlling the flow of hydraulic fluid to and from said hydraulic cylinder; and actuating means connecting said valve means with said control shaft.

16. A loading apparatus comprising, in combination, frame means adapted for attachment to a receiving platform; shaft means journaled for rotation on said frame means; a lift arm including an inner end attached to said shaft means and an outer end; a lift platform pivotally mounted on said outer end of said lift arm; parallel linkage means for maintaining said lift platform in horizontal disposition during rotation of said shaft means; a control shaft journaled on said frame means; a first latch element on said shaft means; a second latch element on said control shaft; a lever on said control shaft for rotating said control shaft to disengage said latch elements; an arm including an inner end attached to said shaft means and an outer end; a hydraulic cylinder pivotally attached to said frame means and including a piston rod pivotally connected to said outer end of said arm; valve means for controlling the flow of hydraulic fluid to and from said hydraulic cylinder; actuating means connecting said valve means with said control shaft; a pump for delivering pressurized fluid to said valve means; an electric motor for driving said pump; a starter switch for energizing said motor for rotation in one direction; and a reverse switch for energizing said motor for rotation in the other direction.

17. The apparatus defined in claim 16 wherein certain of said switches are actuated by movement of said lever.

References Cited by the Examiner

UNITED STATES PATENTS

| | | | |
|---|---|---|---|
| 2,683,539 | 7/1954 | Corley | 214—77 |
| 2,792,135 | 5/1957 | Wood | 214—77 |
| 2,989,196 | 6/1961 | Lugash. | |
| 3,057,491 | 10/1962 | Schlensker | 214—77 |
| 3,084,815 | 4/1963 | Johnson | 214—77 |

GERALD M. FORLENZA, *Primary Examiner.*

HUGO O. SCHULZ, *Examiner.*

R. SHERIDAN, *Assistant Examiner.*